(12) United States Patent
Zoellner et al.

(10) Patent No.: US 11,820,310 B1
(45) Date of Patent: Nov. 21, 2023

(54) PANEL INTRUSION CONTROL

(71) Applicants: Alexander M. Zoellner, Los Gatos, CA (US); Arturo Llamazares Domper, San Jose, CA (US); Christopher D. Jones, Los Gatos, CA (US); David E. Kingman, San Jose, CA (US); Derek C. Scott, Melbourne (AU); Jesse T. Buehler, Portola Valley, CA (US); Rikard Fredriksson, San Jose, CA (US); Stephen B. Lynch, Portola Valley, CA (US)

(72) Inventors: Alexander M. Zoellner, Los Gatos, CA (US); Arturo Llamazares Domper, San Jose, CA (US); Christopher D. Jones, Los Gatos, CA (US); David E. Kingman, San Jose, CA (US); Derek C. Scott, Melbourne (AU); Jesse T. Buehler, Portola Valley, CA (US); Rikard Fredriksson, San Jose, CA (US); Stephen B. Lynch, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/307,318

(22) Filed: May 4, 2021

Related U.S. Application Data

(63) Continuation of application No. 15/983,206, filed on May 18, 2018, now Pat. No. 11,021,126.

(Continued)

(51) Int. Cl.
 *B60R 21/205* (2011.01)
 *B60J 1/02* (2006.01)

(Continued)

(52) U.S. Cl.
 CPC ............ *B60R 21/205* (2013.01); *B32B 17/10* (2013.01); *B60J 1/02* (2013.01); *B60R 21/217* (2013.01);

(Continued)

(58) Field of Classification Search
 CPC ................ B62D 25/082; B62D 25/081; B60R 2021/343; B60R 2021/0004;

(Continued)

(56) References Cited

U.S. PATENT DOCUMENTS 2,070,760 A * 2/1937 Straith .................. B60R 21/045
 296/73
2,755,125 A * 7/1956 Hodges ................... B60R 21/33
 280/732

(Continued)

FOREIGN PATENT DOCUMENTS

CN 203047153 U 7/2013
JP H7125604 A 5/1995

*Primary Examiner* — Drew J Brown
*Assistant Examiner* — Timothy Wilhelm
(74) *Attorney, Agent, or Firm* — Young Basile Hanlon & MacFarlane, P.C.

(57) ABSTRACT

An apparatus for resisting entry of objects through a panel. The apparatus includes a weakened portion that extends laterally across a width dimension of the panel. The apparatus includes a stop structure spaced from the weakened portion that extends laterally across the width dimension of the panel to limit deformation. A bottom edge of the panel is configured to rotate about an axis extending along the weakened portion to abut the stop structure.

20 Claims, 17 Drawing Sheets

Related U.S. Application Data

(60) Provisional application No. 62/575,593, filed on Oct. 23, 2017, provisional application No. 62/527,294, filed on Jun. 30, 2017.

(51) Int. Cl.
  *B60R 21/217* (2011.01)
  *B32B 17/10* (2006.01)
  *B60R 21/231* (2011.01)
  *B60R 21/00* (2006.01)

(52) U.S. Cl.
  CPC ...... *B60R 21/231* (2013.01); *B32B 2605/006* (2013.01); *B60R 2021/0004* (2013.01)

(58) Field of Classification Search
  CPC ... B60R 21/205; B60R 21/231; Y10T 428/15; B60J 1/02; B32B 17/064; B32B 2605/006
  See application file for complete search history.

(56) References Cited

U.S. PATENT DOCUMENTS

| | | | | |
|---|---|---|---|---|
| 2,757,040 A * | 7/1956 | McLelland | ............ | B60R 21/06 280/749 |
| 2,806,737 A * | 9/1957 | Maxwell | ............... | B60R 21/232 280/734 |
| 2,822,187 A * | 2/1958 | Bibbs | ...................... | B60R 21/08 280/752 |
| 2,834,606 A * | 5/1958 | Bertrand | ............... | B60R 21/268 D12/400 |
| 3,443,824 A * | 5/1969 | Dietrich | .................. | B60R 21/06 296/68.1 |
| 3,617,073 A * | 11/1971 | Landsman | ............. | B60R 21/23 200/86.5 |
| 3,650,542 A * | 3/1972 | Shimano | ................ | B60R 21/08 280/749 |
| 3,664,682 A * | 5/1972 | Wycech | .................. | B60R 21/08 280/734 |
| 3,767,229 A * | 10/1973 | Cain | ...................... | B60R 21/16 280/743.1 |
| 3,801,126 A * | 4/1974 | Knight, IV | ........... | B60R 21/276 180/90 |
| 3,817,552 A * | 6/1974 | Knight, IV | ........... | B60R 21/205 280/740 |
| 3,817,553 A * | 6/1974 | Wilfert | .................. | B60R 21/206 180/90 |
| 3,831,705 A * | 8/1974 | Glance | .................. | B60R 21/045 180/90 |
| 3,831,975 A * | 8/1974 | Mednikow | ............. | B60R 21/08 280/749 |
| 3,876,228 A * | 4/1975 | Hawkins | ............... | B60R 21/045 296/70 |
| 3,924,707 A * | 12/1975 | Renner | ................. | B60R 21/045 180/90 |
| 3,930,664 A * | 1/1976 | Parr | ........................ | B60R 21/08 280/743.1 |
| 4,130,298 A * | 12/1978 | Shaunnessey | .......... | B60R 21/33 280/739 |
| 4,171,140 A * | 10/1979 | Toshihisa | ................ | B60R 21/06 296/96.14 |
| 4,270,793 A * | 6/1981 | Harasaki | ............... | B62D 25/081 296/192 |
| 4,530,517 A * | 7/1985 | Miyabayashi | ......... | B60K 37/00 296/187.05 |
| 4,536,008 A * | 8/1985 | Brown, Jr. | ............ | B60R 21/213 280/736 |
| 4,635,962 A * | 1/1987 | Miyada | .................. | B60R 21/08 280/734 |
| 4,718,712 A * | 1/1988 | Nakatani | ............... | B62D 21/15 296/192 |
| 4,832,287 A * | 5/1989 | Werjefelt | ............... | B64D 11/00 280/732 |
| 4,943,102 A * | 7/1990 | Hamamoto | .......... | B62D 25/081 296/192 |
| 4,950,024 A * | 8/1990 | Watari | ................. | B62D 25/081 296/192 |
| 5,112,081 A * | 5/1992 | Kesseru | .................. | B60R 22/14 296/96 |
| 5,232,244 A * | 8/1993 | Itoh | ........................ | B60R 21/08 160/370.21 |
| 5,242,191 A * | 9/1993 | Faigle | .................. | B60R 21/216 280/732 |
| 5,259,642 A * | 11/1993 | Muller | .................. | B60R 21/205 280/732 |
| 5,419,088 A * | 5/1995 | Raymond | .................. | B60J 1/08 52/204.591 |
| 5,588,672 A * | 12/1996 | Karlow | .................. | B60R 21/232 280/730.2 |
| 5,602,734 A * | 2/1997 | Kithil | .................... | B60R 21/213 280/735 |
| 5,746,469 A | 5/1998 | Nonaka | | |
| 5,819,408 A * | 10/1998 | Catlin | .................... | B62D 21/15 296/205 |
| 5,992,877 A * | 11/1999 | Gray | ....................... | B60R 21/23 280/743.1 |
| 6,095,273 A * | 8/2000 | Aboud | ................... | B60R 21/045 296/70 |
| 6,106,000 A * | 8/2000 | Stewart | ................. | B60R 21/213 280/740 |
| 6,164,685 A * | 12/2000 | Fischer | ............... | B60R 21/2165 280/732 |
| 6,179,366 B1 * | 1/2001 | Hansz | ..................... | B60J 3/023 296/214 |
| 6,193,304 B1 * | 2/2001 | Takahashi | ............. | B60S 1/0488 296/192 |
| 6,224,087 B1 * | 5/2001 | Stutz | ..................... | B60R 21/213 280/730.2 |
| 6,224,088 B1 | 5/2001 | Lohavanijaya | | |
| 6,367,872 B1 * | 4/2002 | Bohm | .................... | B62D 65/14 296/210 |
| 6,382,660 B1 * | 5/2002 | Starner | ................. | B60R 21/213 280/730.2 |
| 6,431,586 B1 * | 8/2002 | Eyrainer | ............... | B60R 21/213 280/732 |
| 6,460,878 B2 * | 10/2002 | Eckert | ................. | B60R 21/2342 280/743.1 |
| 6,467,563 B1 * | 10/2002 | Ryan | ...................... | B60R 21/36 180/274 |
| 6,502,854 B2 * | 1/2003 | Mueller | ............... | B60R 21/214 180/281 |
| 6,588,793 B2 * | 7/2003 | Rose | .................. | B60R 21/237 280/728.2 |
| 6,601,902 B1 * | 8/2003 | Rahmstorf | ......... | B60H 1/00028 296/70 |
| 6,672,619 B1 * | 1/2004 | Ennerdal | ................ | B60R 21/08 280/751 |
| 6,702,322 B2 * | 3/2004 | Eyrainer | ............... | B60R 21/231 280/732 |
| 6,722,691 B1 * | 4/2004 | Håland et al. | ......... | B60R 21/233 280/743.2 |
| 6,808,198 B2 * | 10/2004 | Schneider | ............. | B60R 21/237 280/743.1 |
| 6,851,737 B2 * | 2/2005 | Okamoto | ................ | B60R 21/34 296/84.1 |
| 6,913,280 B2 * | 7/2005 | Dominissini | ......... | B60R 21/213 296/214 |
| 6,921,121 B2 * | 7/2005 | Schneider | ............. | B60J 3/0204 296/97.1 |
| 6,948,736 B2 * | 9/2005 | DePottey | ............... | B60R 21/214 280/728.2 |
| 6,966,579 B2 * | 11/2005 | Schneider | ........... | B60R 21/2338 280/730.2 |
| 6,971,670 B1 * | 12/2005 | Eriksson | ............... | B60R 21/231 280/739 |
| 7,000,944 B2 * | 2/2006 | Bakhsh | .................. | B60R 21/213 280/743.1 |
| 7,000,945 B2 * | 2/2006 | Bakhsh | .................. | B60R 21/213 280/728.2 |

(56) References Cited

U.S. PATENT DOCUMENTS

| | | | | |
|---|---|---|---|---|
| 7,004,501 B2* | 2/2006 | Schneider | B60R 21/237 | 280/743.1 |
| 7,029,030 B2* | 4/2006 | Amamori | B60R 21/01512 | 280/743.1 |
| 7,055,852 B2* | 6/2006 | Bakhsh | B60R 21/235 | 280/743.1 |
| 7,108,279 B2* | 9/2006 | Rensinghoff | B60R 21/231 | 280/732 |
| 7,125,069 B2* | 10/2006 | Cacucci | B60R 21/02 | 280/730.2 |
| 7,152,873 B2* | 12/2006 | Peng | B60R 21/2338 | 280/730.1 |
| 7,163,229 B2* | 1/2007 | Hasebe | B60R 21/233 | 280/730.1 |
| 7,174,986 B2* | 2/2007 | Takimoto | B60R 21/2338 | 180/274 |
| 7,185,913 B2* | 3/2007 | Bakhsh | B60R 21/2338 | 280/743.1 |
| 7,213,865 B2* | 5/2007 | Torii | B29C 49/20 | 296/97.1 |
| 7,296,822 B2* | 11/2007 | Bakhsh | B60R 21/213 | 280/743.1 |
| 7,331,597 B2* | 2/2008 | Williams | B60R 21/261 | 280/743.1 |
| 7,357,446 B2* | 4/2008 | Sakai | B60R 21/34 | 296/192 |
| 7,380,815 B2* | 6/2008 | Rose | B60R 21/231 | 280/730.2 |
| 7,508,406 B2* | 3/2009 | Oehrlein | C03B 33/0222 | 296/84.1 |
| 7,540,557 B2* | 6/2009 | Shimura | B62D 25/081 | 296/192 |
| 7,552,964 B2* | 6/2009 | Saito | B62D 25/081 | 296/192 |
| 8,136,870 B2* | 3/2012 | Ott | B62D 25/081 | 296/192 |
| 8,231,140 B2* | 7/2012 | Maripudi | B60R 21/2338 | 280/740 |
| 8,236,217 B2* | 8/2012 | Evans | B60R 21/2165 | 425/388 |
| 8,240,706 B2* | 8/2012 | Bustos Garcia | B60R 21/261 | 280/728.2 |
| 8,480,122 B2* | 7/2013 | Ohara | B60R 21/205 | 280/729 |
| 8,485,553 B1* | 7/2013 | Kuhne | B60R 21/205 | 280/743.2 |
| 9,381,948 B2* | 7/2016 | Takei | B62D 25/081 | |
| 9,415,744 B1* | 8/2016 | Stojkovic | B60R 21/34 | |
| 9,428,129 B2* | 8/2016 | Crona | B60R 19/34 | |
| 9,452,785 B2* | 9/2016 | Tsuneyama | B62D 21/157 | |
| 9,676,361 B2* | 6/2017 | Smith | B60R 21/231 | |
| 9,771,049 B2* | 9/2017 | Lee | B60R 21/213 | |
| 9,932,004 B1* | 4/2018 | Mihm | B60R 19/18 | |
| 9,981,697 B2* | 5/2018 | Nakashima | B60J 10/45 | |
| 9,993,999 B2* | 6/2018 | Alonso Vazquez | B32B 17/10761 | |
| 10,029,543 B2* | 7/2018 | Egusa | B60J 3/0282 | |
| 10,065,591 B2* | 9/2018 | Debler | B60R 21/2176 | |
| 10,093,359 B2* | 10/2018 | Vigil | B62D 25/08 | |
| 10,279,770 B2* | 5/2019 | Faruque | B60R 21/237 | |
| 10,328,886 B2* | 6/2019 | Peyre | B60R 21/261 | |
| 10,421,497 B2* | 9/2019 | Takii | B62D 25/081 | |
| 10,457,239 B2* | 10/2019 | Schneider | B60R 21/233 | |
| 10,864,804 B2* | 12/2020 | Huff | B60J 3/0239 | |
| 2001/0045728 A1* | 11/2001 | Kansteiner | B60R 21/2165 | 280/732 |
| 2003/0001366 A1* | 1/2003 | Debler | B60H 1/00564 | 280/732 |
| 2003/0132621 A1* | 7/2003 | Arieth | B60R 21/205 | 280/732 |
| 2004/0090050 A1* | 5/2004 | Dominissini | B60R 21/213 | 280/730.1 |
| 2004/0100074 A1* | 5/2004 | Bakhsh | B60R 21/232 | 280/730.1 |
| 2004/0188991 A1* | 9/2004 | Schneider | B60R 21/2338 | 280/743.2 |
| 2004/0251668 A1* | 12/2004 | Schneider | B60R 21/237 | 280/743.1 |
| 2005/0001412 A1* | 1/2005 | Schneider | B60R 21/232 | 280/730.1 |
| 2005/0040630 A1* | 2/2005 | Fischer | B60R 21/2165 | 280/732 |
| 2006/0202452 A1 | 9/2006 | Breed et al. | | |
| 2007/0164586 A1* | 7/2007 | Erlingfors | B60H 1/0055 | 296/208 |
| 2011/0076435 A1* | 3/2011 | Tachibana | B62D 25/081 | 428/192 |
| 2011/0304177 A1* | 12/2011 | Walter | B60R 21/34 | 296/201 |
| 2013/0091779 A1* | 4/2013 | Dominique | B60J 1/008 | 52/1 |
| 2017/0043738 A1* | 2/2017 | Peyre | B60R 21/214 | |
| 2017/0174173 A1* | 6/2017 | Peyre | B60R 21/237 | |
| 2019/0054888 A1* | 2/2019 | Fukawatase | B60R 21/206 | |
| 2019/0092268 A1* | 3/2019 | Ishida | B60R 21/205 | |
| 2019/0299912 A1* | 10/2019 | Tanaka | B60R 21/233 | |
| 2020/0254959 A1* | 8/2020 | Navarro Arranz | B60R 21/231 | |
| 2020/0276954 A1* | 9/2020 | Navarro Arranz | B60R 21/2338 | |

\* cited by examiner

PANEL INTRUSION CONTROL

CROSS-REFERENCE TO RELATED APPLICATIONS

This application is a continuation of U.S. application Ser. No. 15/983,206, filed on May 18, 2018, and entitled "Windshield Area Intrusion Control." This application claims the benefit of U.S. Provisional Application No. 62/527,294, filed on Jun. 30, 2017, and entitled "Windshield Area Intrusion Control." This application also claims the benefit of U.S. Provisional Application No. 62/575,593, filed on Oct. 23, 2017, and entitled "Windshield Area Intrusion Control." The contents of the foregoing applications are incorporated by reference herein in their entireties for all purposes.

TECHNICAL FIELD

The application relates generally to panels windshields for vehicles and specifically to resisting entry of objects through such panels.

BACKGROUND

During a vehicular crash, portions of a vehicle will deform upon impact with other objects. A vehicle can be configured to reduce or eliminate entry of structures, such as exterior body components, into a passenger cabin of the vehicle. As an example, crush zones may be designed to allow longitudinal crushing along the hood or fenders of the vehicle in a manner that reduces the likelihood that components will intrude into the passenger cabin. In many jurisdictions, vehicle safety regulations require that no exterior parts of a vehicle intrude into the passenger cabin during a crash. Crash testing, such as a frontal impact with a fixed structure, may be performed to confirm compliance with these regulations.

SUMMARY

One aspect of the disclosed embodiments is an apparatus for resisting entry of objects through a windshield of a vehicle that has a passenger cabin. The apparatus includes an instrument panel that is located between the windshield and the passenger cabin, and an airbag that is deployable into an area above the instrument panel to resist entry of objects into the passenger cabin.

Another aspect of the disclosed embodiments is an apparatus for resisting entry of objects through a windshield of a vehicle that has a passenger cabin. The apparatus includes a panel housing located at a periphery of the windshield, and a deployable panel that deploys from the panel housing in response to a detected impact or an imminent impact to cover a portion of the windshield.

Another aspect of the disclosed embodiments is an apparatus for resisting entry of objects through a windshield of a vehicle that has a passenger cabin. The apparatus includes a fracturable feature that extends laterally across a width dimension of the windshield, and a stop structure that extends laterally across the windshield to limit deformation of a front portion of the vehicle.

Another aspect of the disclosed embodiments is an apparatus for resisting entry of objects through a windshield of a vehicle that has a passenger cabin. The apparatus includes an instrument panel that is formed in part from a compressible structure that, during an impact, is engaged and compressed by the windshield.

Another aspect of the disclosed embodiments is an apparatus for resisting entry of objects through a windshield of a vehicle that has a passenger cabin. The apparatus includes a film layer located on an interior surface of the windshield.

DETAILED DESCRIPTION

The disclosure herein is directed to structures that resist intrusion of objects into the passenger cabin of a vehicle during an impact.

In vehicle designs in which a windshield is positioned near a front extent of the vehicle, the windshield may experience large deformations during an impact, in order to dissipate energy. The structures disclosed herein are intended to resist intrusion of objects into the vehicle from the windshield area during large deformations of the windshield.

Figure 1:
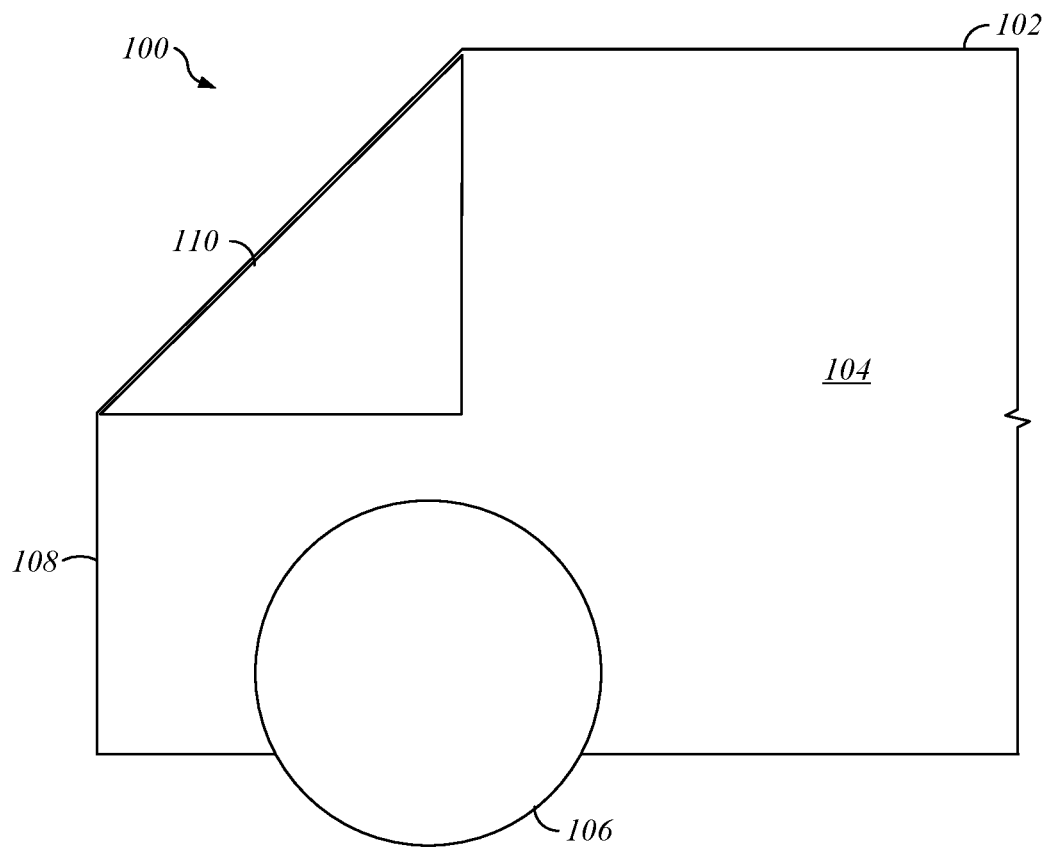
FIG. 1 is an illustration that shows a portion of a vehicle.

FIG. 1 is an illustration that shows a portion of a vehicle 100. The vehicle 100 includes a vehicle body 102, which may be or include a chassis, frame, unibody, monocoque, and/or exterior panels. A passenger cabin 104 is defined inside the vehicle body 102. The vehicle 100 may be supported with respect to a surface (e.g., a road) by wheels 106, and control of the vehicle may be affected through the wheels using actuators such as steering, propulsion, braking, and suspension actuators.

The vehicle 100 has a front portion 108, which defines a front extent of the vehicle 100. In a frontal impact with an object, the front portion 108 of the vehicle 100 may be the first part of the vehicle 100 to contact the object. The vehicle 100 includes a windshield 110. In the illustrated example, the windshield 110 has a raked configuration, with a lower edge of the windshield 110 being positioned at or near the front portion 108 and an upper edge of the windshield 110 being positioned upward and rearward from the lower edge. As an example, a front surface of the windshield 110 may define an angle of around 30 degrees through eighty degrees relative to horizontal. The windshield 110 also extends laterally (i.e., in a cross-car direction) across part of or all of the width of the vehicle 100. In the illustrated example, the windshield 110 has a wrap-around configuration in which portions of the windshield 110 extend to and along the side surfaces of the vehicle 100, but other configurations can also be utilized with the structures described herein.

Figure 2A:
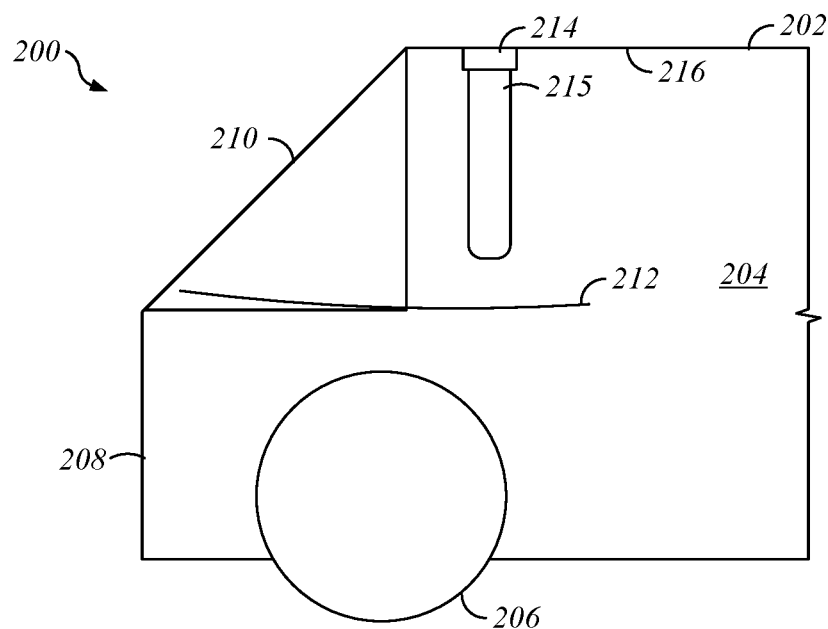
FIG. 2A is a side view illustration that shows a vehicle in which an upper airbag is deployable such that it is positioned between a windshield and a passenger cabin.
Figure 2B:
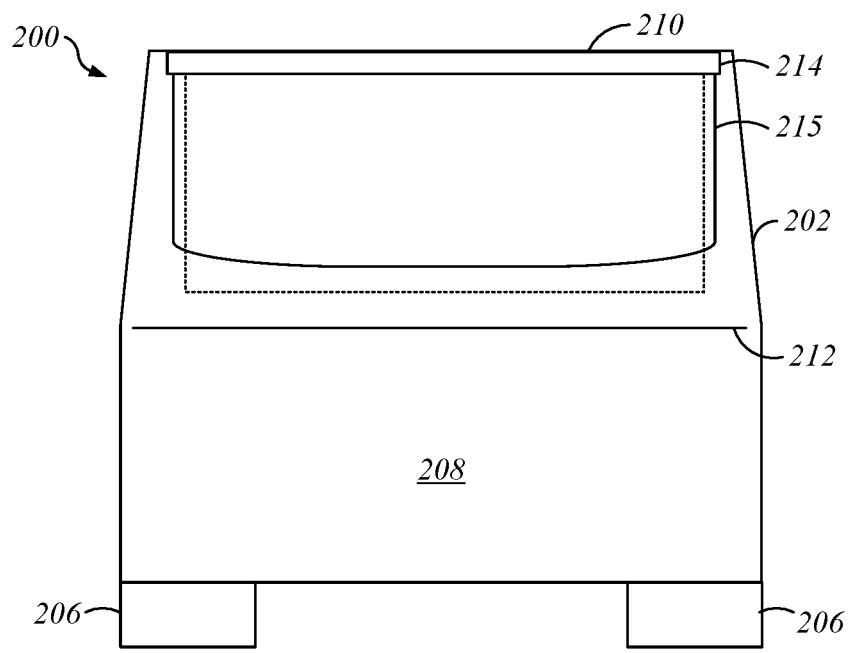
FIG. 2B is a rear-view illustration that shows the vehicle of FIG. 2A.

FIGS. 2A and 2B show a vehicle 200 that includes components that are analogous to those of the vehicle 100, including a vehicle body 202, a passenger cabin 204, wheels 206, a front portion 208, and a windshield 210. The vehicle 200 also includes an instrument panel 212 that is located inside the vehicle body 202 between the windshield 210 and the passenger cabin 204. The vehicle 200 includes one or more airbags that are deployable such that they are positioned between the windshield 210 and the passenger cabin 204. In some implementations, the airbags are disposed entirely over the instrument panel 212, forward from the passenger cabin 204, and do not extend into the passenger cabin 204.

An upper airbag housing 214 is located on an interior surface of a roof 216 of the vehicle body 202. The upper airbag housing 214 may extend across most of or all of the lateral direction of the vehicle 200. An upper airbag 215 is deployable from the upper airbag housing 214, for example, in response to a detected impact or an imminent impact. When deployed, the upper airbag 215 extends downward from the upper airbag housing 214 from the roof 216 toward the instrument panel 212 and extends across most of or all of the lateral direction of the vehicle 200. As an example, the upper airbag 215 may extend across at least ninety percent of an interior width of the vehicle 200 in the lateral direction. The upper airbag 215 may extend all of the way from the upper airbag housing 214 to the instrument panel 212. The upper airbag 215, when deployed may occupy a majority of the width of the vehicle 200 and a majority of the height between the instrument panel 212 and the roof 216, to separate the windshield 210 from the passenger cabin 204.

Figure 3A:
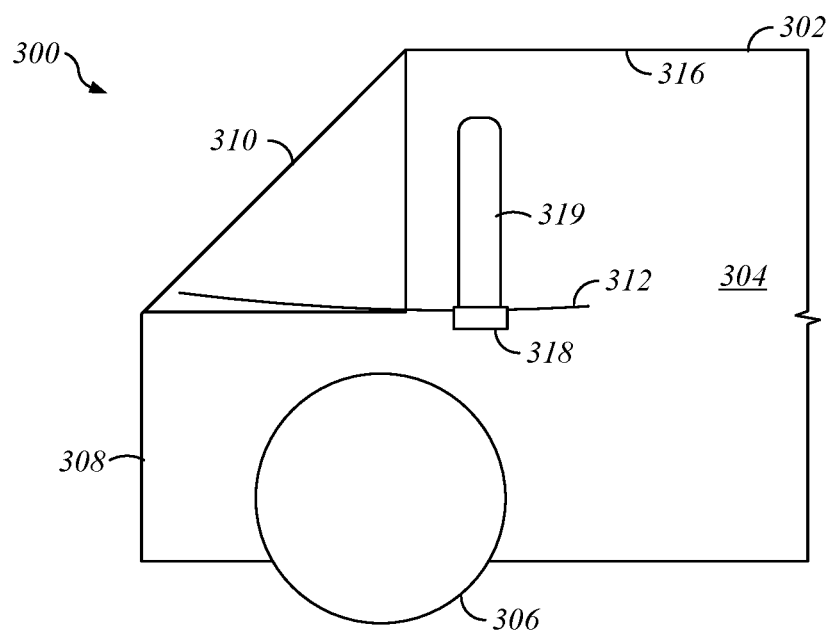
FIG. 3A is a side view illustration that shows a vehicle in which a lower airbag is deployable such that it is positioned between a windshield and a passenger cabin.
Figure 3B:
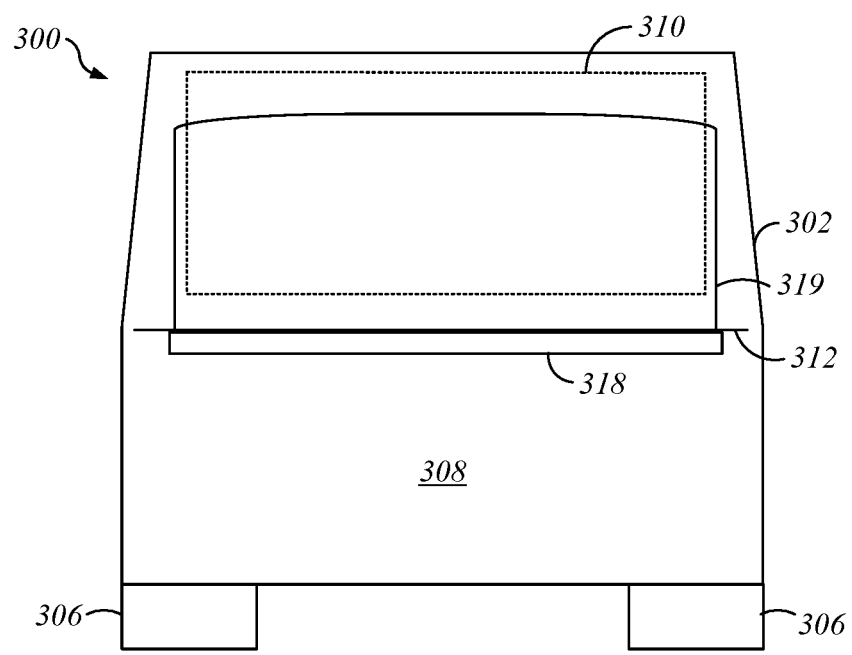
FIG. 3B is a rear-view illustration that shows the vehicle of FIG. 3A.

FIGS. 3A and 3B show a vehicle 300 that includes components that are analogous to those of the vehicle 100, including a vehicle body 302, a passenger cabin 304, wheels 306, a front portion 308, and a windshield 310. The vehicle 300 also includes an instrument panel 312 that is located inside the vehicle body 302 between the windshield 310 and the passenger cabin 304. The vehicle 300 includes one or more airbags that are deployable such that they are positioned between the windshield 310 and the passenger cabin 304. In some implementations, the airbags are disposed entirely over the instrument panel 312, forward from the passenger cabin 304, and do not extend into the passenger cabin 304.

A lower airbag housing 318 is located on or in the instrument panel 312 (e.g., concealed under a surface of the instrument panel 312). The lower airbag housing 318 may extend across most of or all of the lateral direction of the vehicle 300. A lower airbag 319 is deployable from the lower airbag housing 318, for example, in response to a detected impact or an imminent impact. When deployed, the lower airbag 319 extends upward from the lower airbag housing 318 from the instrument panel 312 toward the roof 316 and extends across most of or all of the lateral direction of the vehicle 300. As an example, the lower airbag 319 may extend across at least ninety percent of an interior width of the vehicle 300 in the lateral direction. The lower airbag 319 may extend all of the way from the lower airbag housing 318 to the roof 316. The lower airbag 319, when deployed, may occupy a majority of the width of the vehicle 300 and a majority of the height between the instrument panel 312 and the roof 316, to separate the windshield 310 from the passenger cabin 304.

Figure 4A:
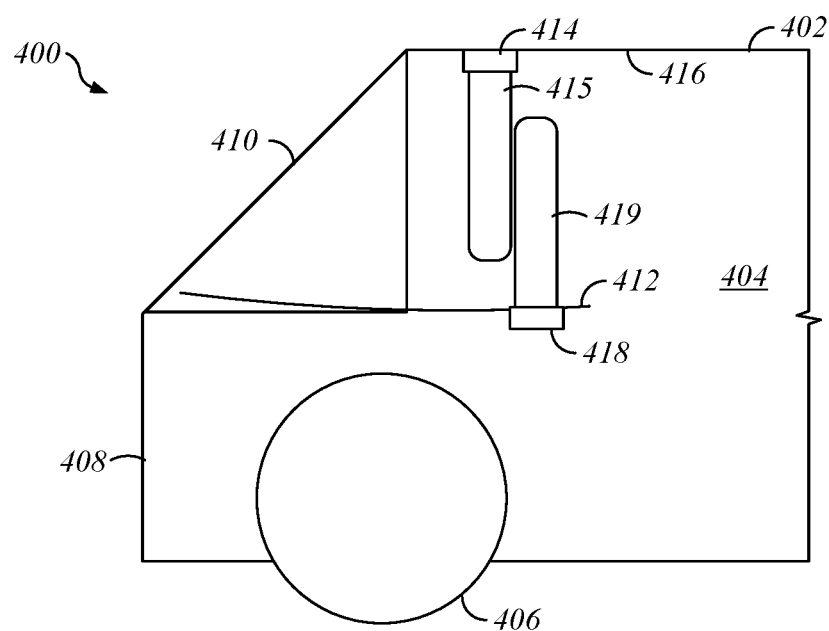
FIG. 4A is a side view illustration that shows a vehicle in which an upper airbag and a lower airbag are deployable such that they are positioned between a windshield and a passenger cabin.
Figure 4B:
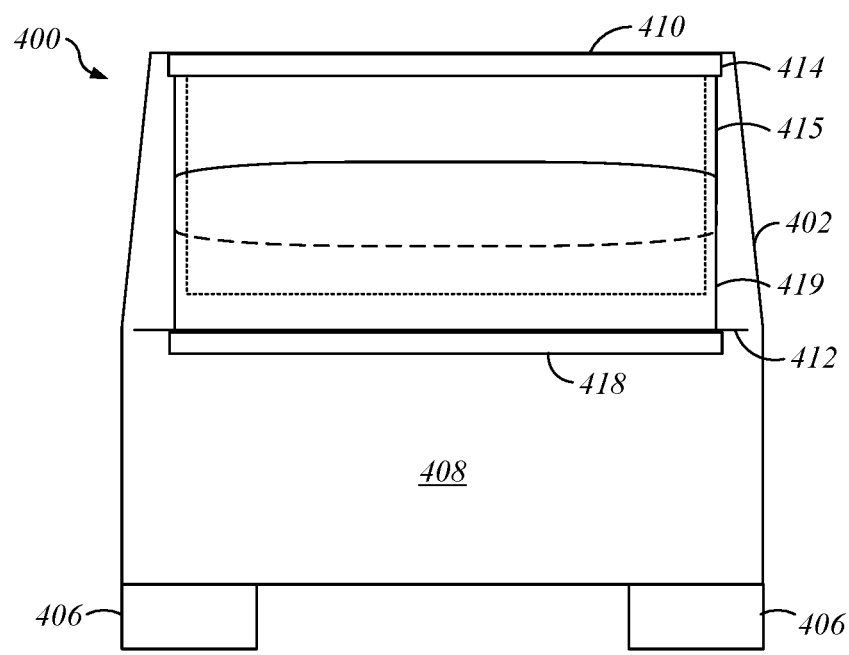
FIG. 4B is a rear-view illustration that shows the vehicle of FIG. 4A.

FIGS. 4A and 4B show a vehicle 400 that includes components that are analogous to those of the vehicle 100, including a vehicle body 402, a passenger cabin 404, wheels 406, a front portion 408, and a windshield 410. The vehicle 400 also includes an instrument panel 412 that is located inside the vehicle body 402 between the windshield 410 and the passenger cabin 404. The vehicle 400 includes one or more airbags that are deployable such that they are positioned between the windshield 410 and the passenger cabin 404. In some implementations, the airbags are disposed entirely over the instrument panel 412, forward from the passenger cabin 404, and do not extend into the passenger cabin 404.

An upper airbag housing 414 is located on an interior surface of a roof 416 of the vehicle body 402. The upper airbag housing 414 may extend across most of or all of the lateral direction of the vehicle 400. An upper airbag 415 is deployable from the upper airbag housing 414, for example, in response to a detected impact or an imminent impact. When deployed, the upper airbag 415 extends downward from the upper airbag housing 414 from the roof 416 toward the instrument panel 412 and extends across most of or all of the lateral direction of the vehicle 400. As an example, the upper airbag 415 may extend across at least ninety percent of an interior width of the vehicle 400 in the lateral direction. The upper airbag 415 may extend all of the way from the upper airbag housing 414 to the instrument panel 412. The upper airbag 415, when deployed may occupy a majority of the width of the vehicle 400 and a majority of the height between the instrument panel 412 and the roof 416, to separate the windshield 410 from the passenger cabin 404.

A lower airbag housing 418 is located on or in the instrument panel 412 (e.g., concealed under a surface of the instrument panel 412). The lower airbag housing 418 may extend across most of or all of the lateral direction of the vehicle 400. A lower airbag 419 is deployable from the lower airbag housing 418, for example, in response to a detected impact or an imminent impact. When deployed, the lower airbag 419 extends upward from the lower airbag housing 418 from the instrument panel 412 toward the roof 416 and extends across most of or all of the lateral direction of the vehicle 400. As an example, the lower airbag 419 may extend across at least ninety percent of an interior width of the vehicle 400 in the lateral direction. The lower airbag 419 may extend all of the way from the lower airbag housing 418 to the roof 416. The lower airbag 419, when deployed, may occupy a majority of the width of the vehicle 400 and a majority of the height between the instrument panel 412 and the roof 416, to separate the windshield 410 from the passenger cabin 404.

The upper airbag housing 414 and the lower airbag housing 418 are slightly offset in a longitudinal direction (e.g., front-to-rear direction). When deployed, the upper airbag 415 and the lower airbag 419 overlap elevationally, and may engage one another to separate the windshield 410 from the passenger cabin 404.

Figure 5A:
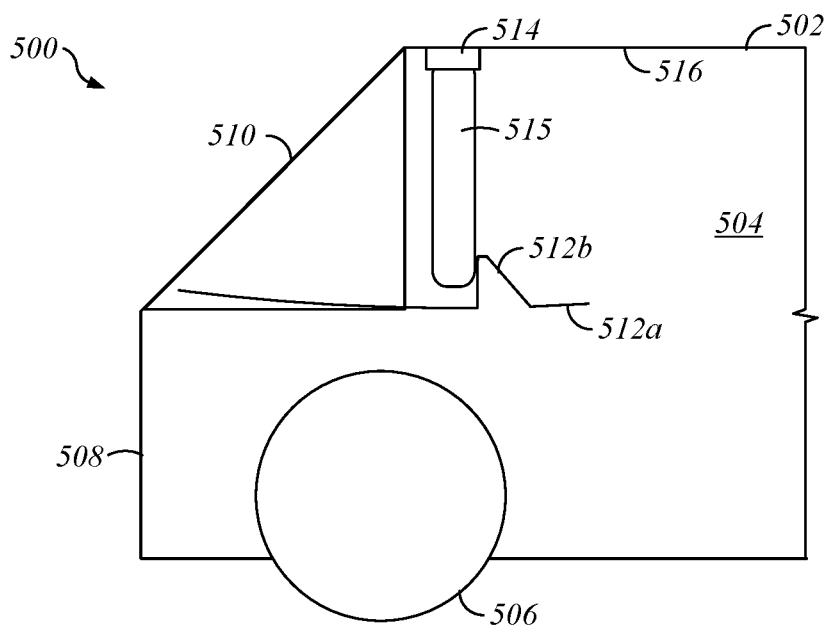
FIG. 5A is a side view illustration that shows a vehicle in which an upper airbag is deployable such that it is engageable with a reaction surface and is positioned between a windshield and a passenger cabin.
Figure 5B:
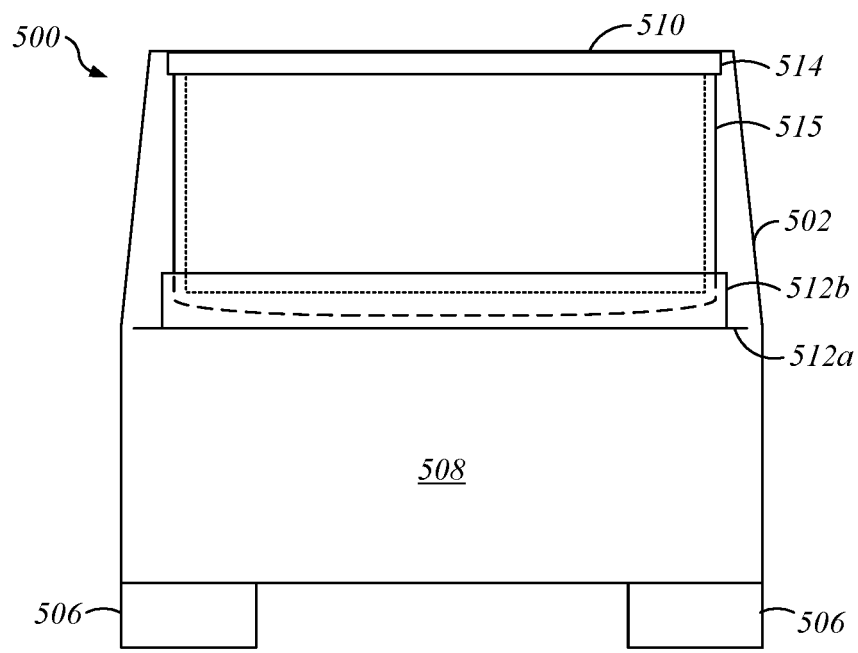
FIG. 5B is a rear-view illustration that shows the vehicle of FIG. 5A.

FIGS. 5A and 5B show a vehicle 500 that includes components that are analogous to those of the vehicle 100, including a vehicle body 502, a passenger cabin 504, wheels 506, a front portion 508, and a windshield 510. The vehicle 500 also includes an instrument panel 512a that is located inside the vehicle body 502 between the windshield 510 and the passenger cabin 504. The vehicle 500 includes one or more airbags that are deployable such that they are positioned between the windshield 510 and the passenger cabin 504. In some implementations, the airbags are disposed entirely over the instrument panel 512a, forward from the passenger cabin 504, and do not extend into the passenger cabin 504.

An upper airbag housing 514 is located on an interior surface of a roof 516 of the vehicle body 502. The upper airbag housing 514 may extend across most of or all of the lateral direction of the vehicle 500. An upper airbag 515 is deployable from the upper airbag housing 514, for example, in response to a detected impact or an imminent impact. When deployed, the upper airbag 515 extends downward from the upper airbag housing 514 from the roof 516 toward the instrument panel 512a and extends across most of or all of the lateral direction of the vehicle 500. As an example, the upper airbag 515 may extend across at least ninety percent of an interior width of the vehicle 500 in the lateral direction. The upper airbag 515 may extend all of the way from the upper airbag housing 514 to the instrument panel 512. The upper airbag 515, when deployed may occupy a majority of the width of the vehicle 500 and a majority of the height between the instrument panel 512a and the roof 516, to separate the windshield 510 from the passenger cabin 504. To provide a reaction surface for the upper airbag 515, a protrusion 512b extends upward relative to the remainder of the instrument panel 512a, and includes a surface that is engageable with the upper airbag 515 when it is deployed, to resist movement of the upper airbag 515 toward the passenger cabin 504.

Figure 6A:
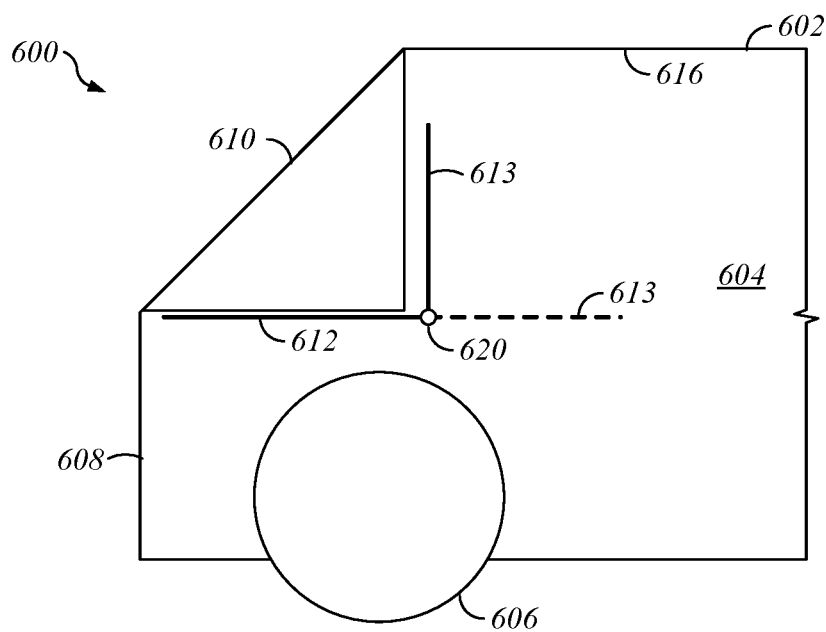
FIG. 6A is a side view illustration that shows a vehicle in which an instrument panel has a moveable portion.
Figure 6B:
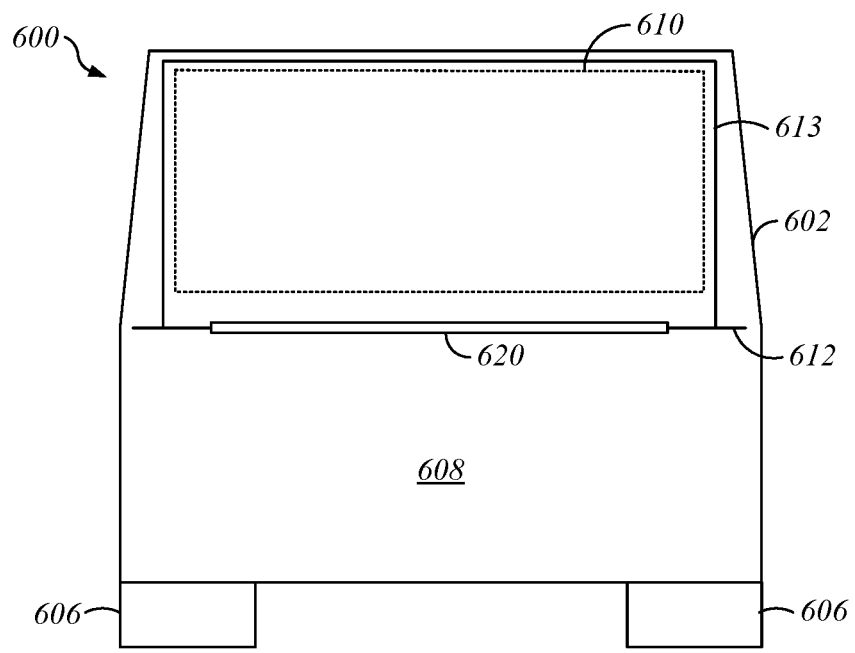
FIG. 6B is a rear-view illustration that shows the vehicle of FIG. 6A.

FIGS. 6A-6B show a vehicle 600 in which an instrument panel has a moveable portion. The vehicle 600 includes components that are analogous to those of the vehicle 100, including a vehicle body 602, a passenger cabin 604, wheels 606, a front portion 608, and a windshield 610. The vehicle 600 also includes an instrument panel 612 that is located inside the vehicle body 602 between the windshield 610 and the passenger cabin 604. The vehicle body 602 of the vehicle 600 includes a roof 616.

The instrument panel 612 includes a moveable portion 613 that defines a lowered position (depicted in broken lines) and a raised position (depicted in solid lines). The moveable portion 613 pivots with respect to the remainder of the instrument panel 612 (which may be fixed) at a joint 620, which may be, as examples, a pin connected joint or a living hinge. The moveable portion 613 may move from the lowered position to the raised position in response to a detected impact or an imminent impact. The moveable portion 613 may be moved by, as examples, a mechanical actuator (e.g., a spring loaded mechanical actuator) or a pyrotechnic actuator. When in the raised position, the moveable portion 613 serves as a separation device that is located between the windshield 610 and the passenger cabin 604. The moveable portion 613 of the instrument panel 612, when deployed, may occupy a majority of the width of the vehicle 600 and a majority of the height between the instrument panel 612 and the roof 616, to separate the windshield 610 from the passenger cabin 204.

Optionally, the upper airbag housing 214 and the upper airbag 215 of the vehicle 200 could be included in the vehicle 600, such that the moveable portion 613 of the instrument panel 612 serves as a reaction surface for the upper airbag 215 when the moveable portion 613 of the instrument panel 612 is in the raised position.

Figure 7A:
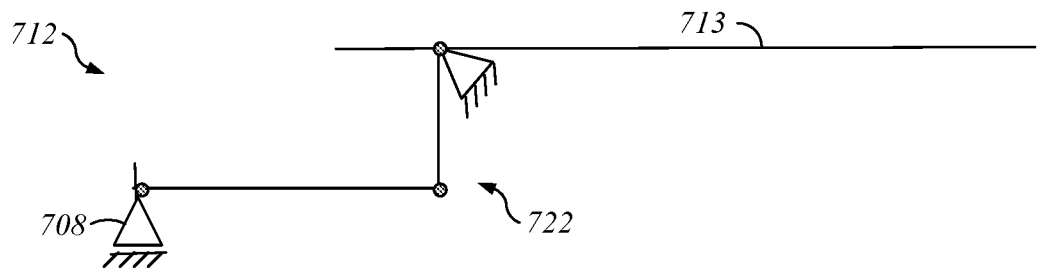
FIG. 7A shows an example of a moveable instrument panel in a lowered position.
Figure 7B:
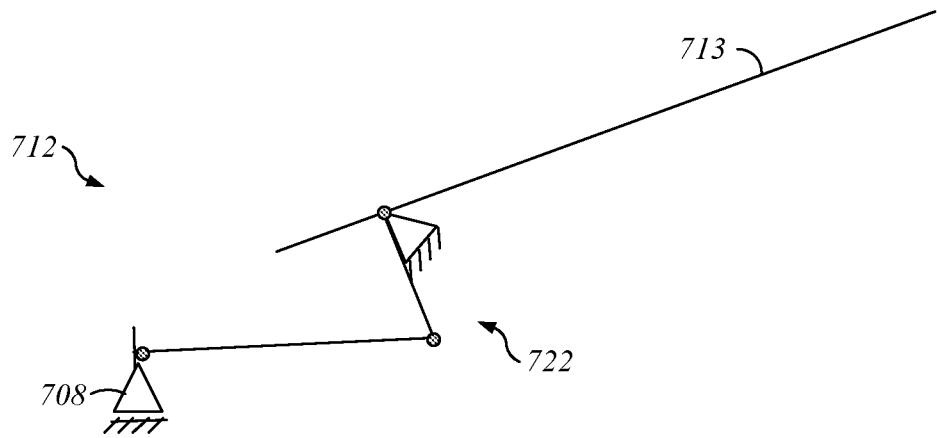
FIG. 7B shows the moveable instrument panel of FIG. 7A in an intermediate position.
Figure 7C:
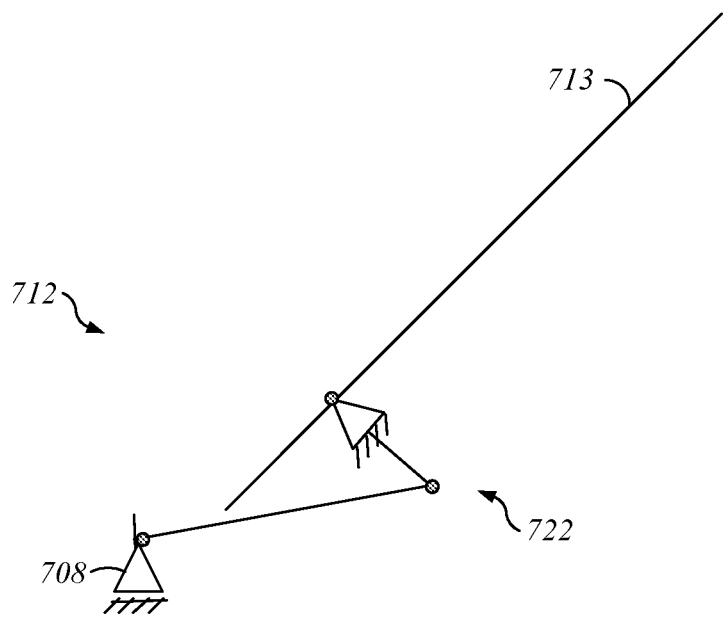
FIG. 7C shows the moveable instrument panel of FIG. 7A in a raised position.

FIGS. 7A, 7B, and 7C show an example of an instrument panel 712 having a moveable portion 713 that moves between a lowered position (FIG. 7A), an intermediate position (FIG. 7B), and a raised position (FIG. 7C) under the influence of a coupling 722 to a front portion 708 (shown schematically) of a vehicle. During an impact, the front portion 708 translates in a generally longitudinal direction, which causes rotation of the coupling 722 relative to the front portion 708. The coupling 722 is rigidly connected to the moveable portion 713 of the instrument panel 712, such that the moveable portion 713 rotates from the lowered position, to the intermediate position, and to the raised position during translation of the front portion 708.

Figure 8A:
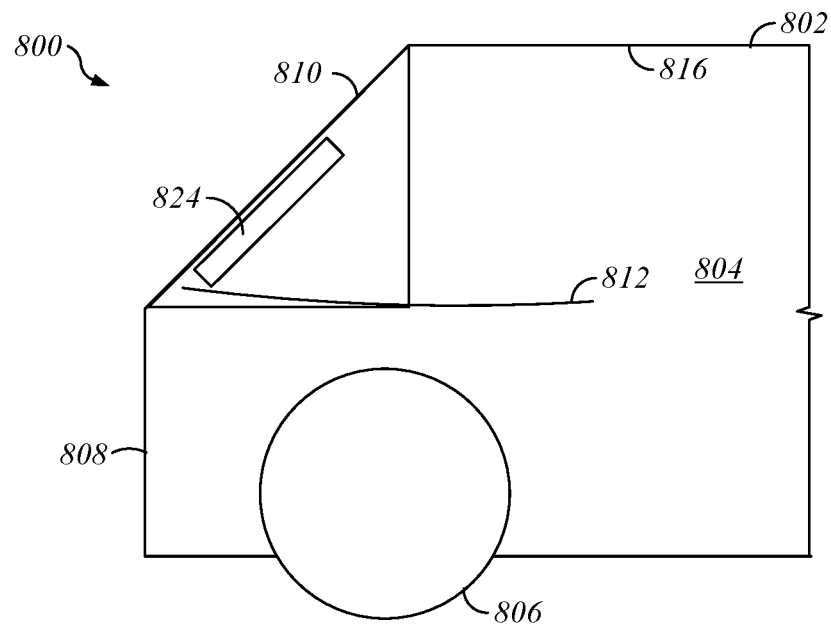
FIG. 8A is a side view illustration that shows a vehicle that includes a deployable panel.
Figure 8B:
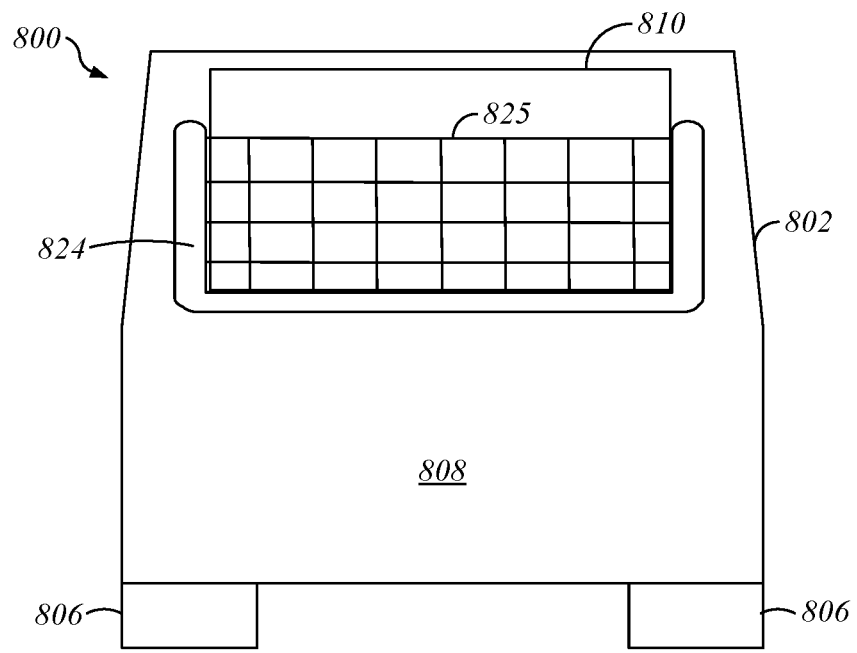
FIG. 8B is a rear-view illustration that shows the vehicle of FIG. 8A.

FIGS. 8A-8B show a vehicle 800 that includes components that are analogous to those of the vehicle 100, including a vehicle body 802, a passenger cabin 804, wheels 806, a front portion 808, a windshield 810, an instrument panel 812, and a roof 816. The vehicle 800 includes, in various implementations, a deployable panel, which can be a sheet of material, such as netting, plastic, or fabric, that is stored around the windshield 810 and deploys in response to a detected impact or an imminent impact. Deployment of the deployable panel can be driven by an inflatable pyrotechnic device, a linear pyrotechnic device, or a mechanical spring actuator.

The vehicle 800 includes a first panel housing 824 is located at a periphery of the windshield 810, below the windshield 810 and at the lateral sides of the windshield 810. A first panel 825 is deployable from the first panel housing 824 to cover a portion of the windshield 810 on the interior of the vehicle 800 to restrain intrusion of objects into the passenger cabin. The first panel 825 can extend, for example, across the lateral width of the windshield 810 and from a lower edge of the windshield 810 upward to or past an elevational midpoint of the windshield 810.

Figure 9A:
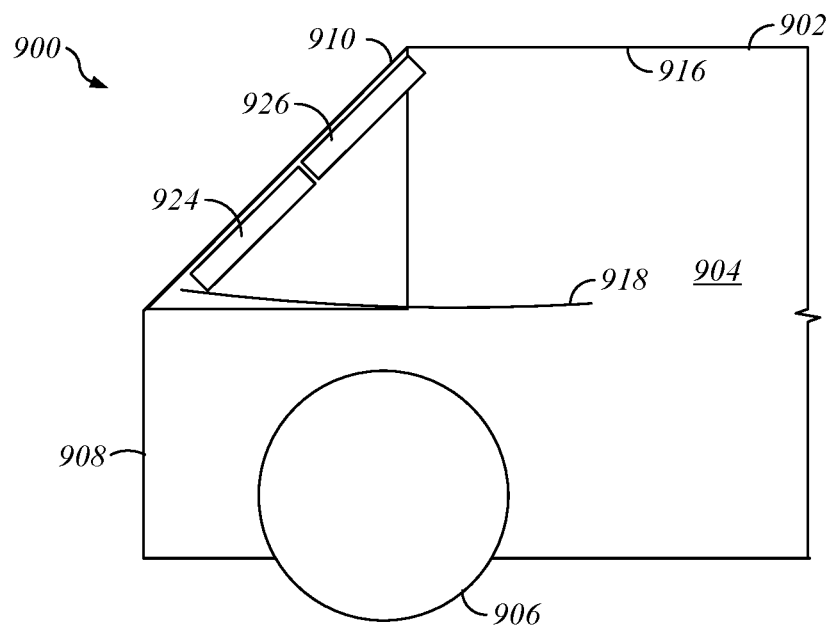
FIG. 9A is a side view illustration that shows a vehicle that includes a deployable panel.
Figure 9B:
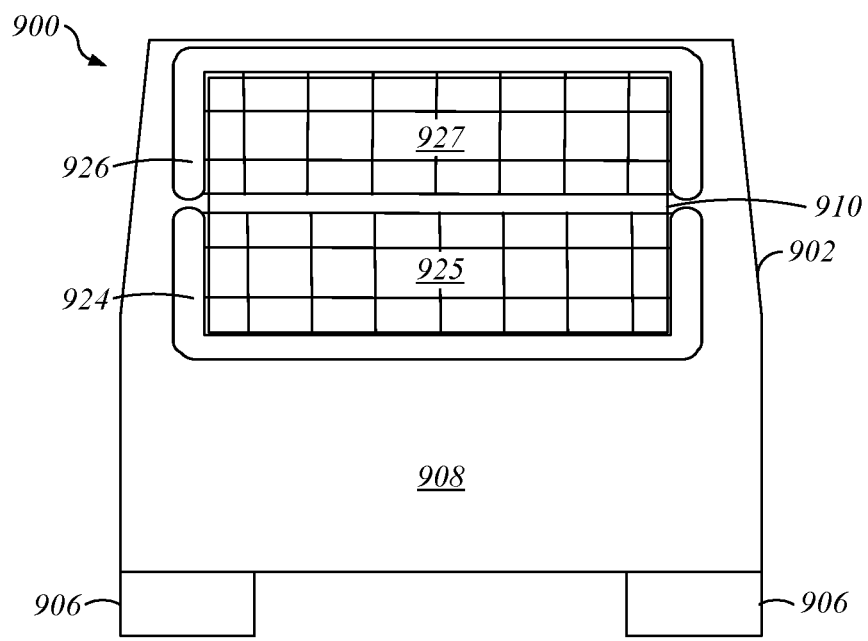
FIG. 9B is a rear-view illustration that shows the vehicle of FIG. 9A.

FIGS. 9A-9B show a vehicle 900 that includes components that are analogous to those of the vehicle 100, including a vehicle body 902, a passenger cabin 904, wheels 906, a front portion 908, and a windshield 910. The vehicle 900 includes, in various implementations, a deployable panel, which can be a sheet of material, such as netting, plastic, or fabric, that is stored around the windshield 910 and deploys in response to a detected impact or an imminent impact. Deployment of the deployable panel can be driven by an inflatable pyrotechnic device, a linear pyrotechnic device, or a mechanical spring actuator.

The vehicle 900 includes a first panel housing 924 and a first panel 925, which are the same as the first panel housing 824 and the first panel 825 of the vehicle 800. The vehicle 900 also includes a second panel housing 926, and a second panel 927. The second panel housing 926 is located at a periphery of the windshield 910, above the windshield 910 and at the lateral sides of the windshield 910. The second panel 927 is deployable from the second panel housing 926 to cover a portion of the windshield 910 on the interior of the vehicle 900 to restrain intrusion of objects into the passenger cabin. The second panel 927 can extend, for example, across the lateral width of the windshield 910 and from an upper edge of the windshield 910 downward to or past an elevational midpoint of the windshield 910. In one implementation, the first panel 925 and the second panel 927 meet near the elevational midpoint of the windshield 910 when deployed. In another implementation, the first panel 925 and the second panel 927 each extend past the elevational midpoint of the windshield 910 when deployed, and overlap each other.

Figure 10A:
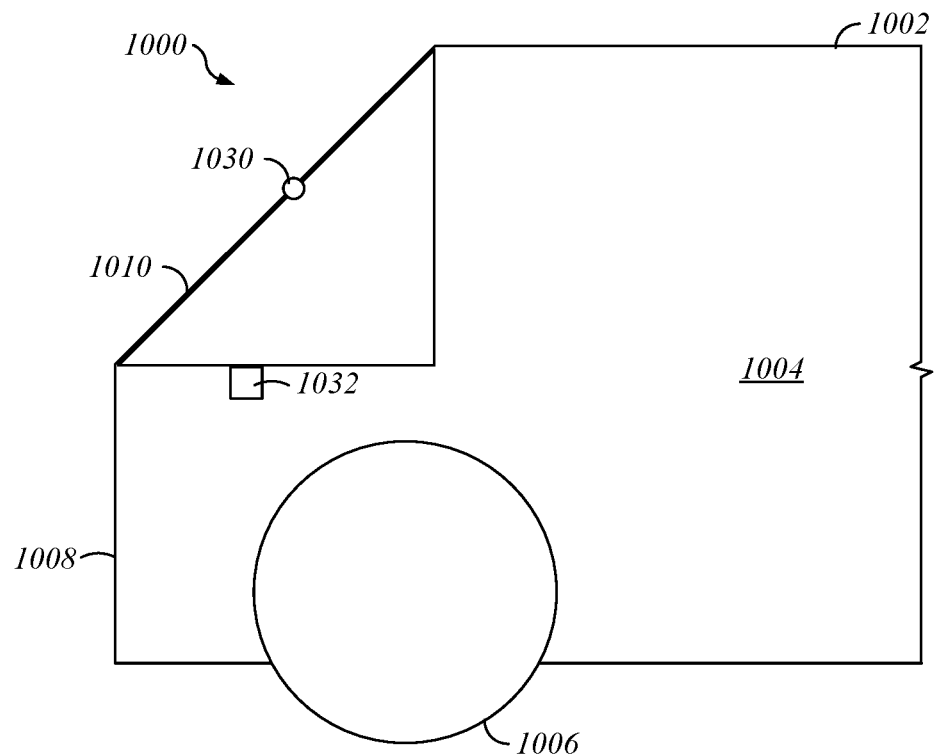
FIG. 10A shows a vehicle in an initial condition.
Figure 10B:
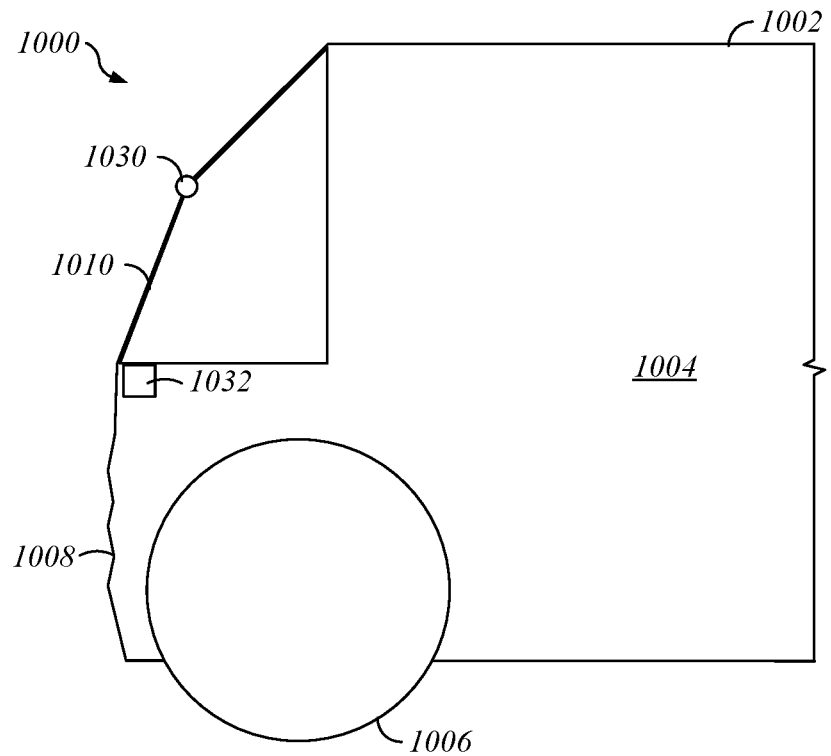
FIG. 10B shows the vehicle of FIG. 10A in a deformed condition.

FIGS. 10A-10B show a vehicle 1000 that includes components that are analogous to those of the vehicle 100, including a vehicle body 1002, a passenger cabin 1004, wheels 1006, a front portion 1008, and a windshield 1010. FIG. 10A shows the vehicle 1000 in an initial condition, and FIG. 10B shows the vehicle 1000 in a deformed condition. The vehicle 1000 includes, in various implementations, a fracturable feature 1030 that extends laterally across the width of the windshield 1010 and a stop structure 1032, which is a structural member that extends laterally across the vehicle 1000 and limits deformation of the front portion 1008 of the vehicle 1000 (see FIG. 10B). The stop structure 1032 may be longitudinally aligned with the fracturable feature 1030 to limit deformation of the front portion 1008 rearward of the fracturable feature 1030. As one example, the fracturable feature 1030 may be a defined notch to break during impact in order to interrupt the load path through the windshield 1010. As another example, the fracturable feature 1030 of the windshield 1010 may be a wire that is embedded in the windshield 1010. As another example, the fracturable feature 1030 may be a pyrotechnic wire that is embedded in the windshield 1010 to break the windshield along a laterally extending line upon activation, for example, in response to a detected impact or an imminent impact. As another example, the fracturable feature 1030 may be omitted in favor of a weakened portion that functions as a living hinge, such that the lower portion of the windshield 1010 rotates about it during an impact.

Figure 11:
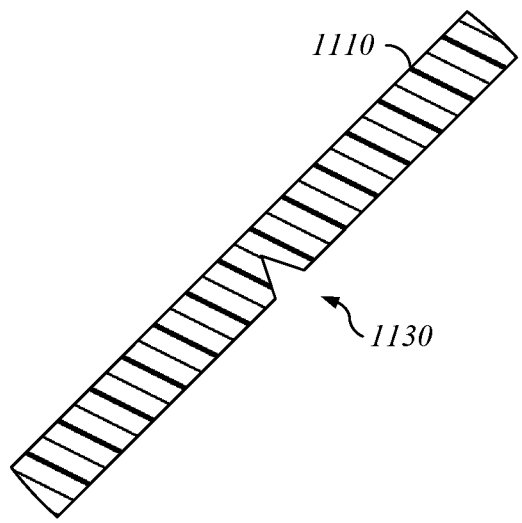
FIG. 11 shows a first example of a defined notch on an interior surface of a windshield.

FIG. 11 shows a first example of a defined notch 1130 on an interior surface of a windshield 1110, which may be used in the vehicle 1000 in place of the windshield 1010. The defined notch 1130 extends inward relative to the windshield 1110 from the interior surface of the windshield 1110 toward the exterior surface of the windshield 1010, and may extend across the windshield 1110 laterally in a generally horizontal line. Thus, the defined notch 1130 may define an elongate, linear, fracturable feature that provides a predetermined location for fracturing of the windshield 1010.

Figure 12:
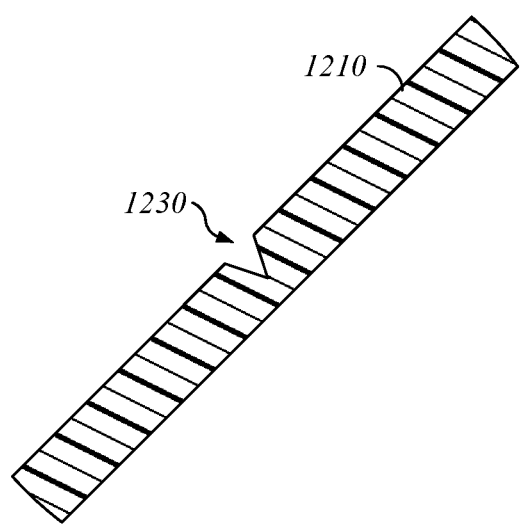
FIG. 12 shows a second example of a defined notch on an exterior surface of a windshield.

FIG. 12 shows a second example of a defined notch 1230 on an exterior surface of a windshield 1210, which may be used in place of the windshield 1010 in the vehicle 1000. The defined notch 1230 extends inward relative to the windshield 1210 from the exterior surface of the windshield 1210 toward the interior surface of the windshield 1210, and may extend across the windshield 1210 laterally in a generally horizontal line. Thus, the defined notch 1230 may define an elongate, linear, fracturable feature that provides a predetermined location for fracturing of the windshield 1210.

Figure 13:
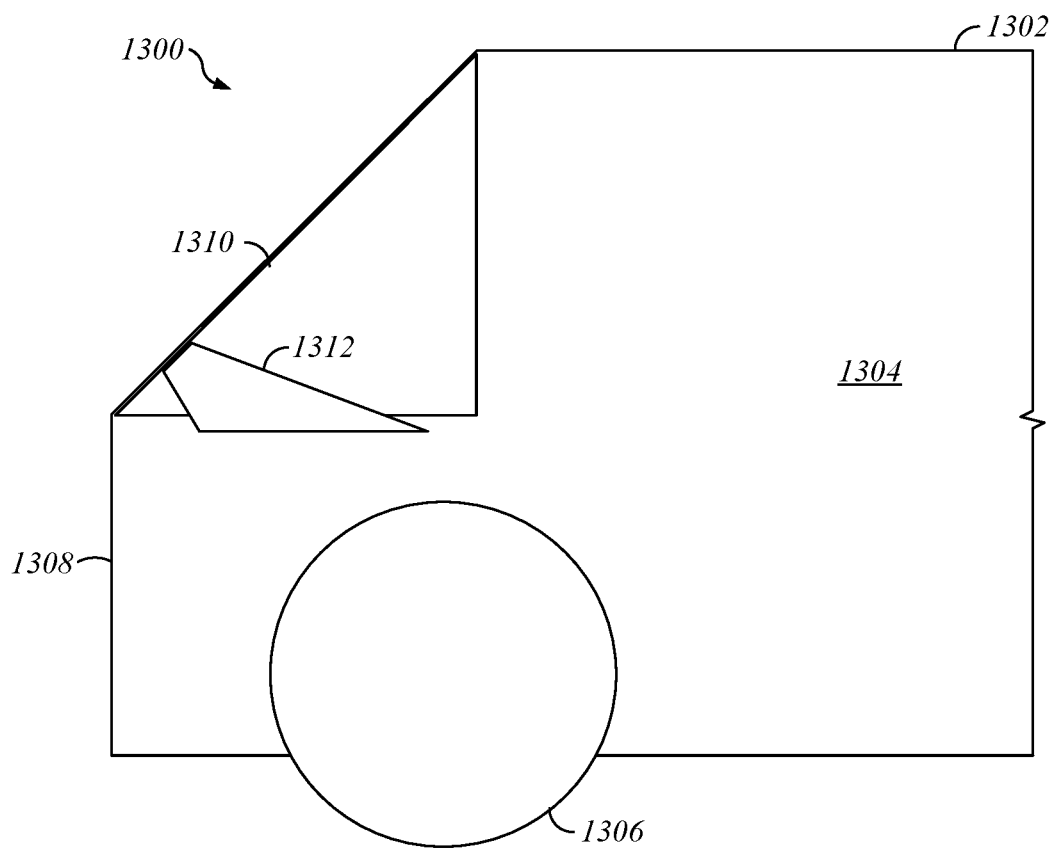
FIG. 13 shows a vehicle that has a compressible instrument panel.

FIG. 13 shows a vehicle 1300 that includes components that are analogous to those of the vehicle 100, including a vehicle body 1302, a passenger cabin 1304, wheels 1306, a front portion 1308, and a windshield 1310. The vehicle 1300 also includes an instrument panel 1312.

The instrument panel 1312 has a top surface that is positioned adjacent to the windshield 1310 at a location that is upward relative to a lower edge of the windshield 1310. As an example, the top surface of the instrument panel 1312 may be located at a distance above the lower edge of the windshield 1310 that is equal to between 10 percent and 30 percent of the height of the windshield 1310 (as measured along the windshield from the lower edge to an upper edge). Thus, the position of the instrument panel 1312 relative to the windshield 1310 shortens the daylight view section of the windshield 1310.

The instrument panel 1312, in this implementation, is formed in part from a compressible structure that, during an impact, is engaged and compressed by the windshield 1310 in order to resist intrusion. However, the instrument panel 1312 does not provide substantial support for the windshield 1310 in an intrusion direction (i.e., toward the passenger cabin 1304). As an example, at least part of the instrument panel 1312 may be formed from a soft foam material.

Figure 14A:
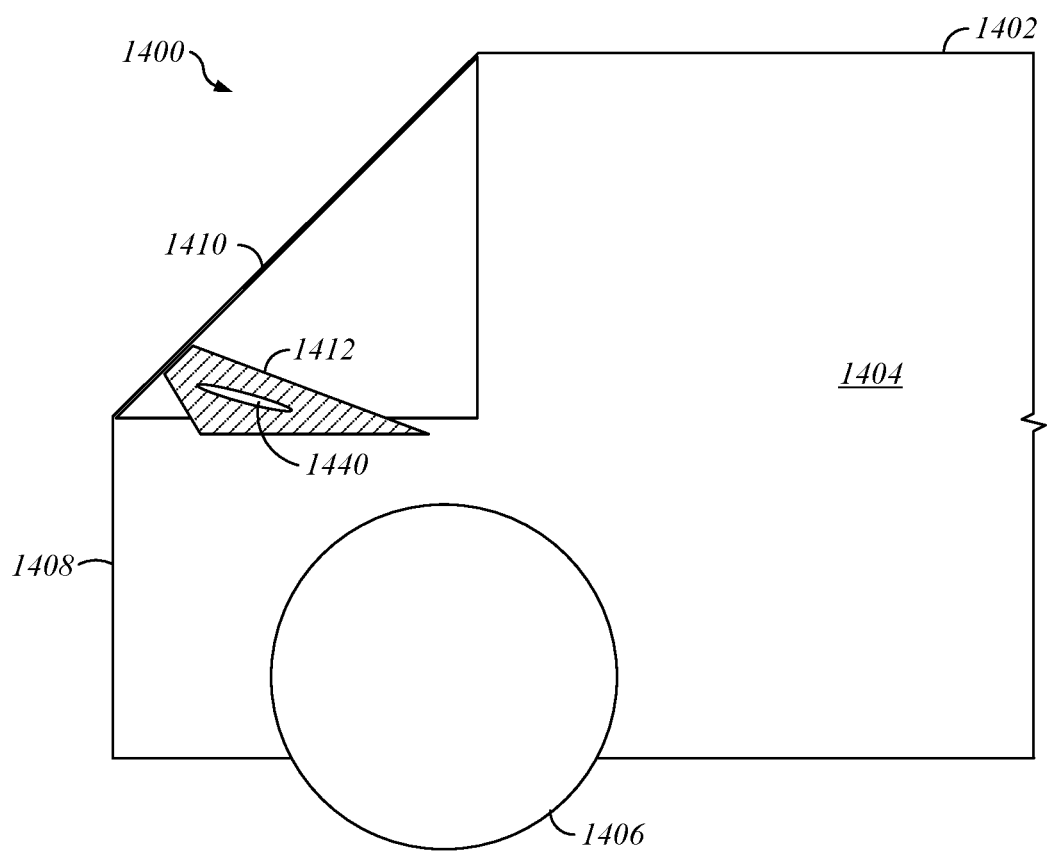
FIG. 14A shows a vehicle that has a compressible instrument panel and an inflatable portion in an uninflated condition.
Figure 14B:
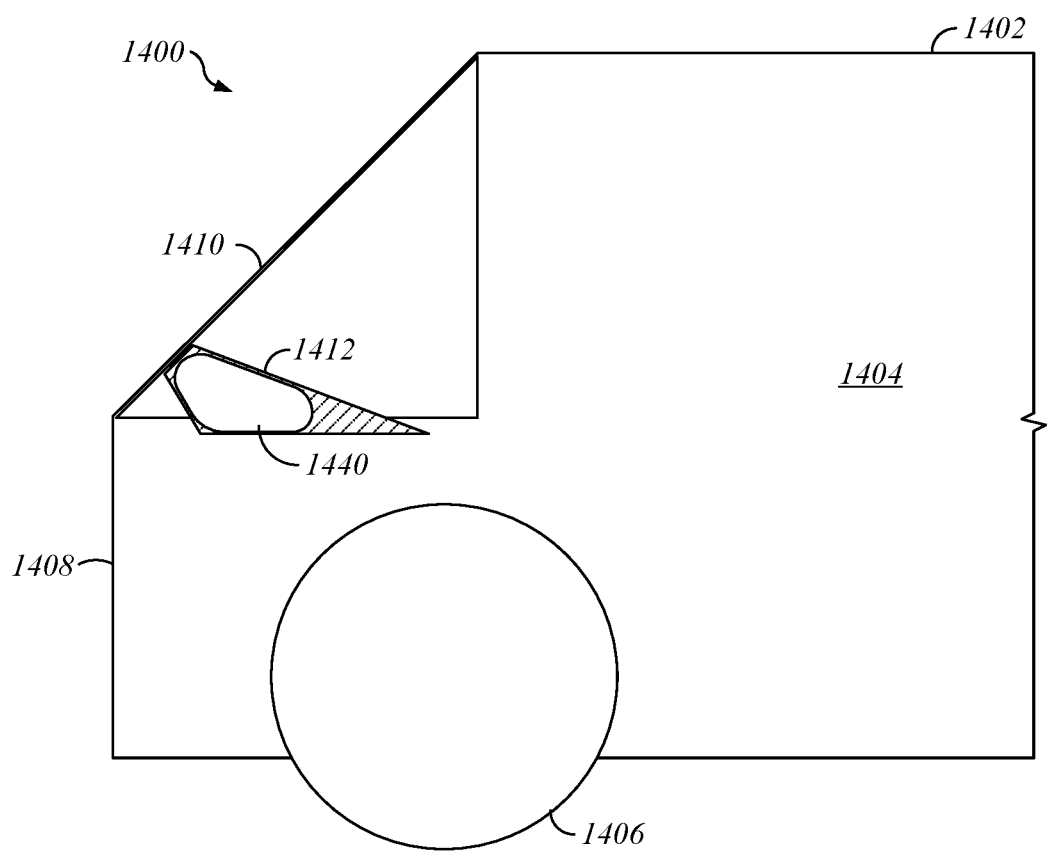
FIG. 14B shows the vehicle of FIG. 14A with the inflatable portion of the compressible instrument panel in an inflated condition.

FIGS. 14A-14B show a vehicle 1400 that includes components that are analogous to those of the vehicle 100, including a vehicle body 1402, a passenger cabin 1404, wheels 1406, a front portion 1408, and a windshield 1410. The vehicle 1400 also includes an instrument panel 1412.

The instrument panel 1412 is similar to in the instrument panel 1312 and is configured per the previous description except as otherwise described. Thus, the instrument panel 1412 is positioned relative to the windshield 1410 to shorten the daylight view section of the windshield 1410 and is formed in part from a compressible structure that, during an impact, is engaged and compressed by the windshield 1410 in order to resist intrusion but does not provide substantial support for the windshield 1410 in the intrusion direction.

An inflatable structure 1440 is disposed inside the instrument panel 1412, adjacent or within compressible portions of the instrument panel 1412. The inflatable structure 1440 is initially in a deflated condition (FIG. 14A). In response to a detected impact or an imminent impact, the inflatable structure 1440 can be inflated (e.g., by a pyrotechnic inflator as with airbags) to define an inflated condition (FIG. 14B) in which the inflatable structure 1440 stiffens the instrument panel 1412. A controller (e.g., computing device provided with executable program instructions) can determine whether to inflate the inflatable structure 1440 when the detected impact or imminent impact occurs, for example, based on sensor information that describes the impact, such as a direction or intensity. Thus, in some situations, the inflatable structure 1440 is not inflated and the instrument panel 1412 remains compressible. In other situations, the inflatable structure 1440 is inflated and reduces the compressibility of the instrument panel 1412.

Figure 15:
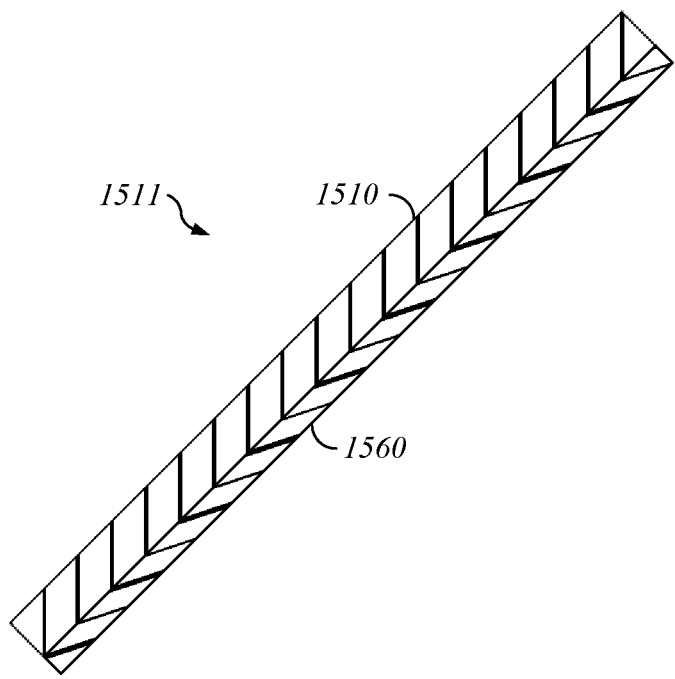
FIG. 15 shows a vehicle windshield assembly that has a film layer.

FIG. 15 shows a windshield assembly 1511 that can be used with the vehicle 100 or other vehicles. The windshield assembly 1511 includes a windshield 1510 that can be similar to the windshield 110 and installed in a vehicle in the same manner. The windshield assembly 1511 also includes a film layer 1560 that is adhered to the interior surface of the windshield 1510 on the side of the windshield 1510 that faces a passenger cabin of the vehicle. Thus, the film layer 1560 is exposed to the passenger cabin of the vehicle, as opposed to being disposed between two layers of glass or plastic as part of a laminated structure. The film layer 1560 can be a thin, transparent cover sheet on the inside of the windshield 1510 to prevent intrusion of loose particles. As an example, the film layer 1560 may be formed from polyvinyl butyral (PVB).

Figure 16A:
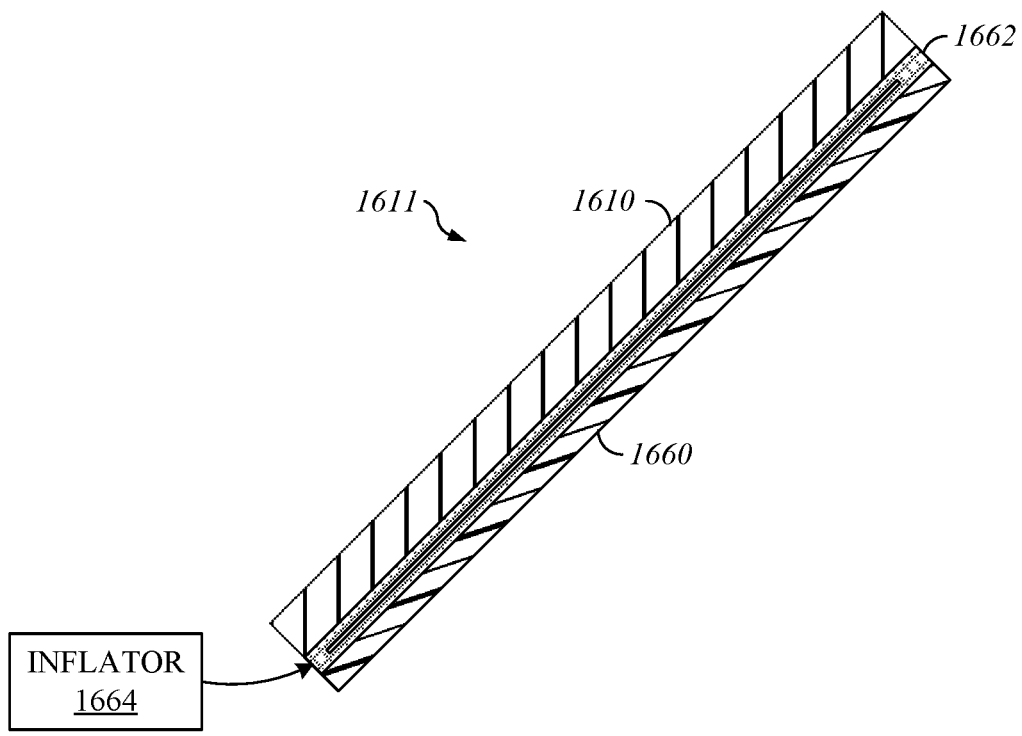
FIG. 16A show a windshield assembly that has a film layer and a transparent inflatable structure in an uninflated condition.
Figure 16B:
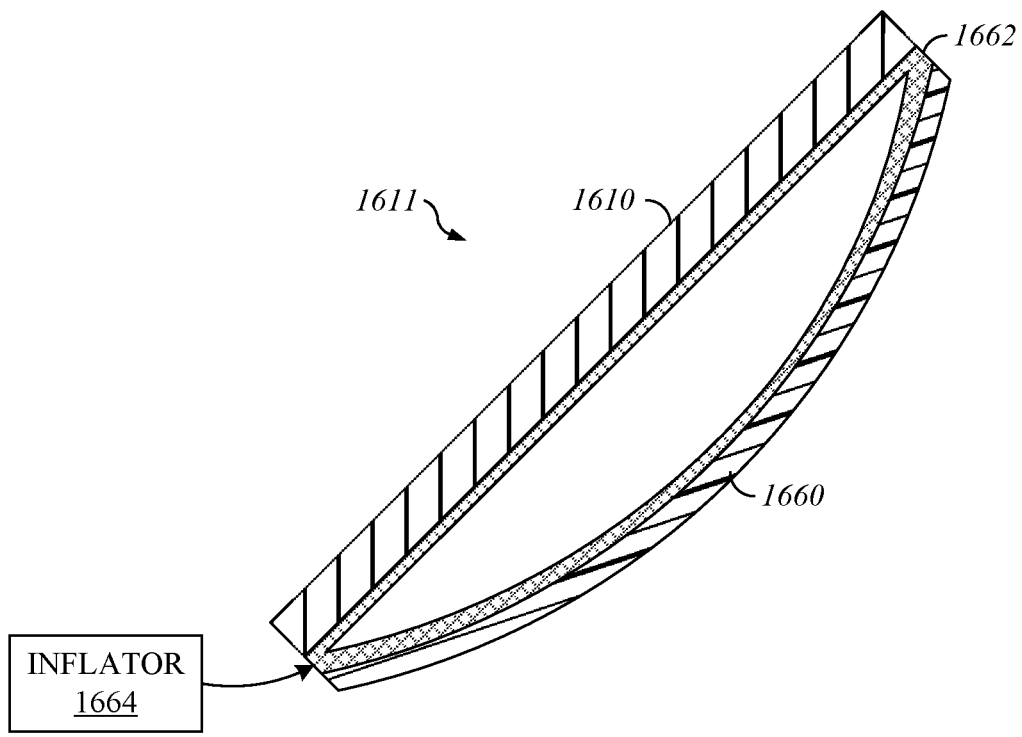
FIG. 16B shows the windshield assembly of FIG. 16A with the transparent inflatable structure in the inflated condition.

FIGS. 16A-16B show a windshield assembly 1611 that can be used with the vehicle 100 or other vehicles. The windshield assembly 1611 can be configured as described with respect to the windshield assembly 1511 except as noted, including a windshield 1610 and a film layer 1660 formed from, for example, PVB. A translucent inflatable structure 1662 is located between the windshield 1610 and the film layer 1660 and an inflator 1664 is configured to supply inflation gas to the translucent inflatable structure 1662. As an example, the inflator 1664 can be a pyrotechnic inflator, as with airbags. The translucent inflatable structure 1662 is initially in a deflated condition (FIG. 16A). In response to a detected impact or an imminent impact, the translucent inflatable structure 1662 can be inflated by the inflator 1664. This creates an inflated volume in contact with the windshield 1610 to restrain intrusion of loose particles. In addition, the film layer 1660 is separated from the windshield 1610, such that cracking of the windshield 1610 does not cause corresponding tearing of the film layer 1660.

In some implementations, a separate inflatable structure is omitted. Instead, the film layer 1660 is located adjacent to the windshield 1610, but is not bonded to it, and the space between the windshield 1610 and the film layer 1660 is inflatable to separate the film layer 1660 from the windshield 1610.

Figure 17:
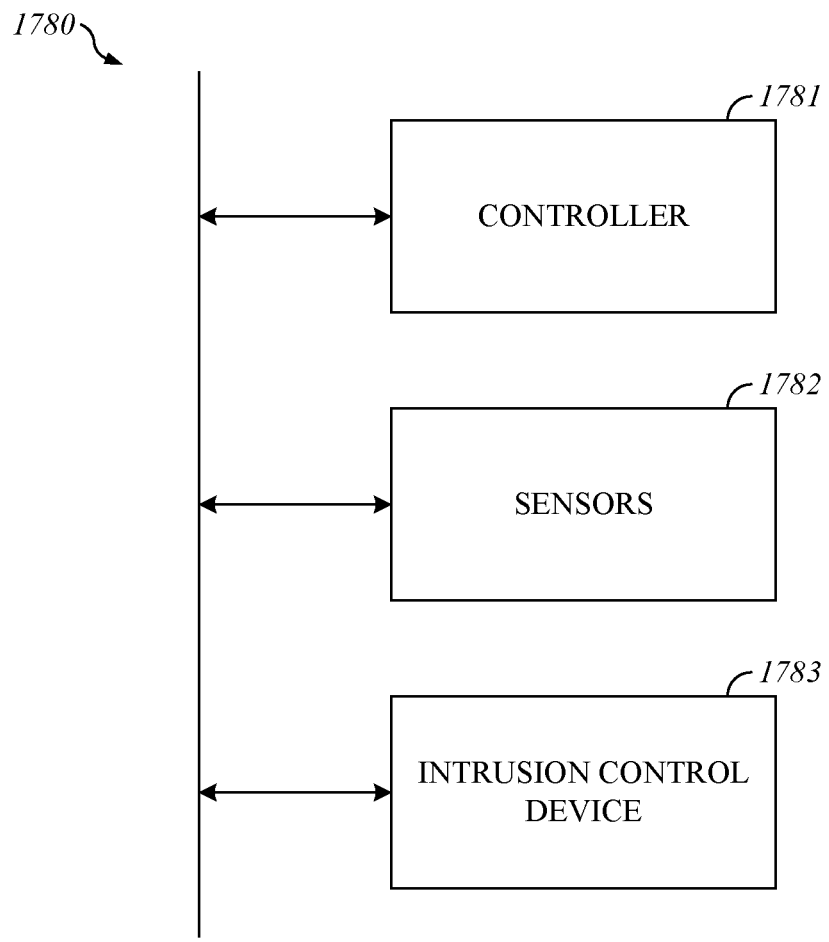
FIG. 17 is a block diagram that shows an intrusion control system

FIG. 17 is a block diagram that shows an intrusion control system 1780 that includes active components that are actuated in response to a sensed impact or an imminent impact in order to prevent intrusion of objects into the passenger cabin of a vehicle through the windshield area. The intrusion control system 1780 includes a controller 1781, sensors 1782, and an intrusion control device 1783. The controller 1781 is a device that is operable to determine whether to activate the intrusion control device 1783 in response to inputs, such as information received from the sensors 1782. The controller 1781 may be, for example, a computing device provided with program instructions. The program instructions can cause the controller 1781 to activate the intrusion control device 1783 in response to a sensed impact or an imminent impact. As an example, the sensors 1783 may include contact sensors or accelerometers, and the outputs of these can be used to detect an impact, such as when the contact sensors indicate contact or when the accelerometers indicate an acceleration or differential acceleration (from two sensors) in excess or a threshold. An imminent impact can be determined, for example, by using the sensors 1783 to track objects, predicting likely future positions of the objects, and identifying an imminent impact based on the predicted future positions. The intrusion control devices 1783 is any type of controllable device that can be deployed to restrain entry of objects through the windshield area of a vehicle, such as the devices described in connection with FIGS. 2-16B.

What is claimed is:

1. An apparatus for resisting entry of objects into a passenger cabin of a vehicle, the apparatus comprising:
   a weakened portion that extends laterally across a width dimension of a panel, wherein the panel forms an interior surface of the passenger cabin of the vehicle; and
   a stop structure spaced from the weakened portion that extends laterally across the vehicle for the width dimension of the panel,
   wherein a bottom edge of the panel is configured to rotate about an axis extending along the weakened portion to abut the stop structure to limit deformation of a portion of the vehicle forward of the stop structure with respect to the passenger cabin.

2. The apparatus of claim 1, wherein the stop structure is aligned in a fore-aft direction with the weakened portion with respect to the passenger cabin to limit deformation of the portion of the vehicle from progressing rearward of the weakened portion fracturable feature and the stop structure.

3. The apparatus of claim 1, wherein the stop structure extends parallel to the weakened portion.

4. The apparatus of claim 1, wherein the weakened portion is linear, elongate, and provides a predetermined location for fracturing of the panel.

5. The apparatus of claim 1, wherein the stop structure limits deformation of the panel from progressing rearward of the weakened portion.

6. The apparatus of claim 1, wherein the panel is a windshield, and wherein the portion of the vehicle is a front portion of the vehicle.

7. The apparatus of claim 1, wherein the weakened portion is a defined notch that extends inward relative to the panel and from an interior surface of the panel toward an exterior surface of the panel.

8. The apparatus of claim 1, wherein the weakened portion is a defined notch that extends inward relative to the panel from an exterior surface of the panel toward an interior surface of the panel.

9. The apparatus of claim 1, wherein the weakened portion fractures during an impact in order to interrupt a load path through the panel.

10. The apparatus of claim 1, wherein the weakened portion includes a pyrotechnic wire embedded in the panel, and wherein the pyrotechnic wire is configured to break the panel in response to an impact or imminent impact detected by a sensor of the vehicle and based on a command from a controller.

11. An apparatus for resisting entry of objects into a passenger cabin of a vehicle, the apparatus comprising:
    a first panel that forms an interior surface of the passenger cabin of the vehicle;
    a second panel that forms another interior surface of the passenger cabin,
    wherein the second panel is configured to abut a portion of the first panel during an impact, and
    wherein the second panel is formed from a compressible structure that, during the impact, is engaged and compressed by the portion of the first panel without initially providing substantial support in a direction towards the passenger cabin; and an inflatable structure configured to inflate within an interior of the second panel to reduce compressibility of the second panel by the first panel.

12. The apparatus of claim 11, wherein the second panel does not provide substantial support for the first panel.

13. The apparatus of claim 12, wherein a portion of the second panel that includes the inflatable structure is formed from a foam material.

14. The apparatus of claim 11, wherein the first panel is a windshield and the second panel is an instrument panel disposed within an interior of the passenger cabin.

15. The apparatus of claim 11, wherein the inflatable structure is located within the second panel and inflatable within the interior of the second panel to support exterior walls of the second panel.

16. The apparatus of claim 11, wherein the inflatable structure inflates in response to an impact or imminent impact detected by a sensor of the vehicle and based on a command from a controller.

17. The apparatus of claim 16, wherein the inflatable structure inflates after initial stages of the impact based on the command from the controller.

18. The apparatus of claim 11, wherein the second panel is configured to abut the first panel at a distance above a lower edge of the first panel that is equal to between 10 percent and 30 percent of a height of the first panel.

19. The apparatus of claim 11, further comprising:
a pyrotechnic inflator that inflates the inflatable structure.

20. The apparatus of claim 11, wherein the inflatable structure is adjacent to the compressible structure within the interior of the second panel.

* * * * *